United States Patent
Kettler et al.

[15] 3,671,860
[45] June 20, 1972

[54] MAXIMUM CURRENT INDICATOR FOR ELECTRICAL APPARATUS

[72] Inventors: Clarence J. Kettler; Clifford L. Downs, both of Lenox, Mass.

[73] Assignee: General Electric Company

[22] Filed: Oct. 24, 1969

[21] Appl. No.: 869,067

[52] U.S. Cl. .................................... 324/103 P, 324/106
[51] Int. Cl. ................................. G01r 5/22, G01r 19/16
[58] Field of Search .................. 324/103, 103 P, 99, 106

[56] References Cited

UNITED STATES PATENTS

| | | | |
|---|---|---|---|
| 2,659,234 | 11/1953 | Harrison | 324/99 X |
| 2,997,652 | 8/1961 | Engen | 324/106 |
| 3,219,929 | 11/1965 | King | 324/106 X |
| 3,396,336 | 8/1968 | Cropper | 324/103 |
| 3,491,295 | 1/1970 | Van Saun | 324/106 X |

Primary Examiner—Rudolph V. Rolinec
Assistant Examiner—Ernest F. Karlsen
Attorney—Francis X. Doyle, Vale P. Myles, Frank L. Neuhauser, Oscar B. Waddell and Joseph B. Forman

[57] ABSTRACT

A maximum current indicator to monitor the current flow in an electrical apparatus. A facsimile of load current from a current transformer is applied to a heater resistor. A sensor resistor having a high positive temperature coefficient is coupled to the heater such that the steady state temperature of the sensor is directly proportional to the power dissipated in the heater, making such temperature a function of the facsimile load current. The sensor resistor is part of a voltage divider network which includes a rheostat, the voltage across such divider being determined by a Zener diode. The divider output voltage at a junction thereof is determined by the sensor resistor and the rheostat. A pair of transistors are arranged in an emitter coupled binary circuit whose conduction states are determined by the voltage at the junction of the divider network. An isolation transformer and a silicon controlled rectifier form a switching circuit which is actuated by the binary circuit. A motor is controlled by the switch, the motor acting to set an indicator dial and also to drive the rheostat to a position for resetting of the binary circuit.

5 Claims, 1 Drawing Figure

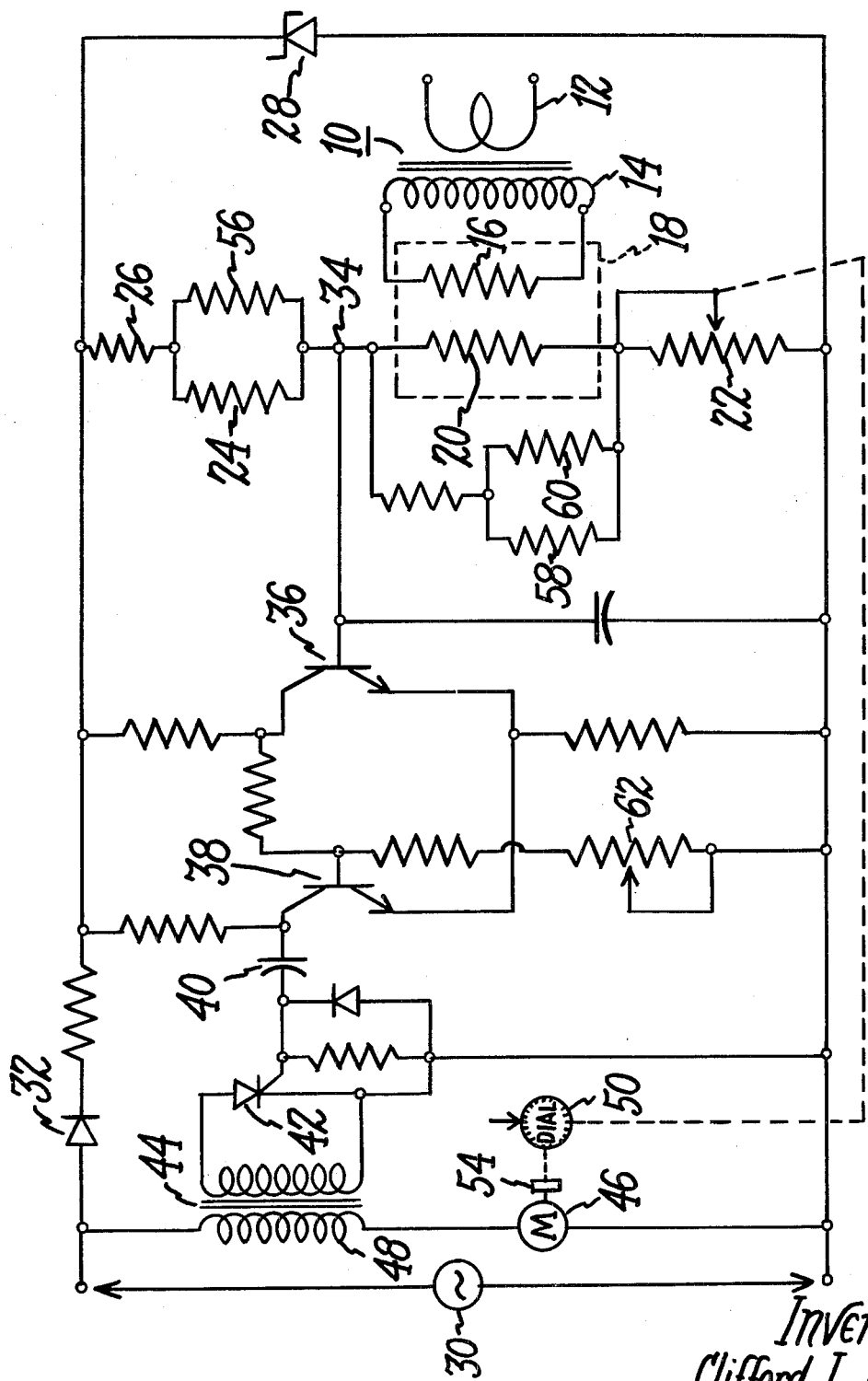

MAXIMUM CURRENT INDICATOR FOR ELECTRICAL APPARATUS

BACKGROUND OF THE INVENTION

This invention relates to a current indicator device and more particularly to a maximum current indicator for electrical apparatus.

Many utilities using various types of electrical apparatus such as transformers, regulators and the like need to know the maximum current flowing in such apparatus. This information is necessary to enable the utilities to determine the necessity of changing out such apparatus to one of a higher capacity in order to adequately carry the load being served by such apparatus. In many instances, utilities add current demand meters to such apparatus for providing this necessary information.

As is well known, these current demand meters are usually of instrument quality and are thermally actuated. Of course, such instrument quality meters are relatively expensive and usually of a considerable size. As will be understood, it is desirable to provide a maximum current indicator for use with electrical apparatus which will be of a relatively inexpensive construction and of a small size. It is also desirable to have a maximum current indicator which will provide an indication of the highest current level which has flowed in the electrical apparatus and one which may be utilized to readily provide an indication of the present current level flowing in such electrical apparatus.

It is, therefore, one object of this invention to provide a novel current indicator for electrical apparatus.

A further object of this invention is to provide a novel maximum current indicator which may be reset to provide an indication of present current level.

A still further object of this invention is to provide a novel maximum current indicator for electrical apparatus having an integrating interval for current measurement.

SUMMARY OF THE INVENTION

In carrying out this invention in a preferred form, a heater device is provide which heats a sensor resistor proportional to the current flow in an electrical apparatus. The sensor resistor is placed in a voltage divider network which includes a rheostat, the divider output voltage being determined by the sensor and the rheostat. A transistor emitter coupled binary circuit is electrically connected to the divider such that the conduction state changes according to the voltage across the sensor and the rheostat. The emitter coupled binary circuit is connected to a switching device which actuates a motor to drive a current indicating dial when the voltage across the sensor and rheostat exceeds the threshold voltage of the binary circuit. The motor is also used to drive the rheostat in a direction to lower the voltage across the rheostat and sensor to thereby de-energize the motor.

Temperature compensation may also be provided by utilizing a plurality of temperature sensitive resistors connected into the divider network.

The invention sought to be protected will be particularly pointed out and distinctly claimed in the claims appended hereto. However, it is believed that this invention and the manner in which its various objects and advantages are obtained, as well as other objects and advantages thereof, may be better understood by reference to the following detailed description of a preferred embodiment particularly when considered in connection with the accompanying drawing.

BRIEF DESCRIPTION OF DRAWING

The single sheet of drawing is a schematic diagram of one form of maximum current indicator according to the present preferred embodiment of this invention.

DESCRIPTION OF PREFERRED EMBODIMENT

According to the preferred embodiment of this invention of a maximum current indicator, a temperature sensitive resistor is provided in a voltage divider network to provide a voltage output which is a function of the maximum current flowing in an electrical apparatus. The voltage output is used to change the conduction state of an emitter coupled binary circuit. The change in conduction of the binary circuit actuates a switching means to energize a motor which drives a dial to indicate the maximum current. The driving of the dial also sets a rheostat in the voltage divider network to change the output voltage and thereby reset the conduction state of the binary circuit and de-energize the motor.

Referring now to the drawing, there is shown a schematic diagram of the present preferred embodiment of the maximum current indicator of this invention. As shown, a current transformer 10 has its primary 12 connected to the electrical apparatus (not shown) whose maximum current is to be indicated. As will be understood, the current in the electrical apparatus (not shown) will flow through the primary 12. A secondary winding 14 of the current transformer 10 has a current induced therein proportional to the primary current. A heater resistor 16 is connected across the secondary 14 as shown. Heater 16 is mounted in a thermal box 18 with a heat sensitive resistor 20. The heat sensitive resistor 20, or sensor, is wound of a high temperature coefficient wire such that its resistance increases with temperature. The thermal coupling of heater 16 and sensor 20 is designed such that a desired thermal time constant, for example 10 minutes, exists between them. As will be apparent, the steady state temperature of the sensor 20 is directly proportional to the power dissipated in heater 16 and, thus, the steady state temperature of sensor 20 is a function of the input current to the heater 16. Since sensor 20 is temperature sensitive, its resistance is also a function of the input current to heater 16.

Temperature sensitive resistor 20 is placed in a voltage divider network which comprises a rheostat 22 and a pair of serially connected resistors 24 and 26. The voltage across the voltage divider network 20, 22, 24 and 26 is determined by the breakdown diode 28. As will be apparent, diode 28 will clip the half-way rectified supply voltage from a source 30 and rectifier 32 at a constant peak level. The divider output voltage at junction or connection 34 will be determined by the resistance of resistor 20 and the resistance of rheostat 22.

A pair of transistors 36 and 38 are connected in an emitter coupled binary circuit as shown. The voltage at junction 34 which is applied to the base of transistor 36, is normally maintained below the threshold voltage of transistor 36. Therefore, in the emitter coupled binary circuit, the transistor 38 is conducting while transistor 36 is turned off or in its non-conducting state. When the voltage at junction 34 exceeds the threshold voltage of transistor 36, transistor 36 will be turned on and begin conducting while transistor 38 will be turned off or rendered non-conducting. When transistor 38 is turned off, a pulse is applied through the coupling capacitor 40 to the gate of a silicon controlled rectifier 42. This causes the rectifier 42 to conduct for a half cycle. An isolation transformer 44 and rectifier 42 are connected as shown to form a switch for controlling motor 46. As will be understood, when rectifier 42 is conducting, primary 48 of isolation transformer 44 has a low impedance allowing current to flow to the motor 46. When the rectifier 42 is not conducting, the impedance of primary 48 is high, preventing current flow to motor 46.

A dial 50 to indicate maximum current is mechanically coupled to the drive shaft of motor 46, as indicated. Mechanically coupled to dial 50 for movement therewith is rheostat 22, as indicated by the dotted line 52. Motor 46 is unidirectional, but is provided with a clutch, indicated at 54, so that dial 50 may be reset manually to the minimum current position. As dial 50 is moved upscale by motor 46, rheostat 22 is moved in a direction to decrease its resistance.

As will be apparent from the above description, over any given period the maximum current indicator will respond only to current levels that are higher than the current level indicated on dial 50. At higher current levels, the resistance of resistor 20 will increase due to the increased temperature of heater 16 and the voltage at junction 34 will exceed the threshold voltage of transistor 36 causing it to conduct. Conduction of transistor 36 shuts off transistor 38, causing rectifier 42 to conduct. This will energize motor 46, driving dial 50 upscale to the higher voltage level, while simultaneously reducing the resistance of rheostat 22 to bring the voltage at junction 34 below the threshold voltage of transistor 36. This, of course, starts transistor 38 conducting and turns off the rectifier 42, thus, de-energizing motor 46.

As will be apparent from the above, the indicator circuit may be employed to indicate the present current level flowing in the electrical apparatus (not shown). The dial 50 may be reset to its minimum position without disturbing the motor 46 by means of clutch 54. At the same time as dial 50 is reset, rheostat 22 will be moved to a higher resistance position which will thereby increase the voltage at junction 34. The increased voltage will energize motor 46 and move dial 50 upscale to the present current level indicated by the heat of heater 16.

As is well understood by those skilled in the art, ambient temperatures can affect the resistance of the sensor 20 and appear to be a change in current level. To compensate for ambient temperatures a network of resistors 56, 58 and 60 are provided in the voltage divider network. Resistor 24 in the voltage divider network will be provided with a high positive temperature coefficient similar to resistor 20 while resistor 56 will be insensitive to temperature change. Resistor 58 will be a resistor having an exponential negative temperature coefficient while resistor 60 will also be insensitive to temperature change. As will be apparent, resistor 56 will serve to modify the characteristics of resistor 24 while resistor 60 will serve to modify the characteristics of resistor 58. Of course, it will be apparent that the temperature compensation will be complex because of the non-linearities in the characteristics of the heater 16 and sensor resistor 20. The heat transfer between the two will vary with ambient temperature and the change in resistance of the sensor 20 for a given change in temperature will vary with the nominal temperature of the sensor 20. The type of characteristics and the resistance value of each of the compensating components is determined by analysis of the circuit behavior over a wide range of ambient temperatures. Of course, it will be readily understood by those skilled in the art that the type of resistors necessary to provide the temperature compensation may be readily computed in accordance with such analysis of the circuit.

As is well understood, the electrical characteristics of transistors, such as 36 and 38, may vary. This can lead to difficulty in balancing the binary circuit which includes these transistors. A calibration rheostat 62 may be provided in the binary circuit, as shown, to provide the desired calibration of the binary circuit regardless of the transistor characteristics.

While there has been shown and described the present preferred embodiment of this invention, it will be apparent to those skilled in the art that various changes may be made without departing from the spirit and scope of the invention. For example, it will be apparent that in instances of low current apparatus it will be unnecessary to utilize the current transformer and the heater resistor 16 may be directly connected to the current of the electrical apparatus. These and other changes will, of course, be obvious to those skilled in the art.

What is claimed as new and which it is desired to secure by Letters Patent of the United States is:

1. A maximum current indicator for indicating the maximum current flow in an electrical apparatus comprising in combination
   a. a heater member connected to be heated proportional to the current flow in an electrical apparatus,
   b. a sensor resistor having a positive temperature coefficient,
      1. said sensor resistor thermally coupled to said heater,
   c. a voltage divider network including said sensor resistor, a rheostat and at least another resistor,
      1. a junction in said voltage divider having said sensor resistor and said rheostat on one side and said at least another resistor on the other side,
   d. means for maintaining a constant voltage across said voltage divider,
   e. a pair of transistors coupled to form an emitter coupled binary circuit,
      1. said junction of said voltage divider electrically connected to the base of one of said pair of transistors,
      2. the voltage at said junction normally being below the threshold voltage of said one transistor whereby said one transistor is non-conducting and the other of said pair of transistors is conducting,
   f. an electric motor connected to a source of electrical energy,
   g. a switch means connected between one side of said motor and said source of electrical energy,
      1. said switch normally being open such that said motor is de-energized when said other transistor is conducting and said switch being closed to energize said motor when said other transistor is non-conducting,
   h. a current indicator connected to the drive shaft of said motor to be driven upscale when said motor is energized,
      1. a mechanical coupling between said dial and said rheostat to move said rheostat when said dial is moved,
a rise in temperature of said heater in response to an increase in current of the electrical apparatus increasing the resistance of said sensor thereby increasing the voltage at said junction to turn on said one transistor and turn off said other transistor to energize said motor and drive said dial upscale, movement of said scale adjusting said rheostat to decrease the voltage of said junction turning off said one transistor and de-energizing said motor.

2. A maximum current indicator as claimed in claim 1 in which said switch means comprises an isolation transformer and a silicon controlled rectifier, the primary of said transformer in circuit with said motor and the secondary of said transformer in circuit with said rectifier, and the gate of said rectifier electrically connected to said other transistor.

3. A maximum current indicator as claimed in claim 1 in which said means for maintaining a constant voltage across said voltage divider includes a Zener diode connected in parallel circuit with said voltage divider.

4. A maximum current indicator as claimed in claim 1 in which temperature compensation is provided by a plurality of resistors connected in said voltage divider, where said at least another resistor has a positive temperature coefficient and has in parallel circuit a temperature insensitive resistor, and a negative temperature coefficient resistor is connected in parallel circuit with said sensor resistor with a temperature insensitive resistor connected in parallel circuit with said negative temperature coefficient resistor.

5. A maximum current indicator for indicating the maximum current flow in an electrical apparatus, comprising in combination;
   a. a sensor resistor heated proportional to the current flow in the electrical apparatus,
   b. a voltage divider network including a rheostat, said sensor resistor, and at least another resistor,
      1. a junction in said voltage divider with said rheostat and said sensor resistor on one side of said junction and said another resistor on the other side,
   c. a source of voltage across said voltage divider,
      1 the voltage at said junction determined by the resistance of said sensor resistor and said rheostat,
   d. a unidirectional motor electrically connected to said junction, said motor actuated by an increase in voltage at said junction,
   e. a current indicator, 1. said current indicator coupled to said motor to be driven upscale by said motor,
2. and a mechanical connection between said indicator and said rheostat whereby said rheostat is driven by said indicator to decrease said voltage at said junction.

* * * * *